United States Patent
Crewson et al.

(10) Patent No.: US 9,470,256 B2
(45) Date of Patent: Oct. 18, 2016

(54) STAMPED CLEVIS

(71) Applicants: Gary Crewson, Hamburg, NY (US); Bernard Malka, Marietta, GA (US)

(72) Inventors: Gary Crewson, Hamburg, NY (US); Bernard Malka, Marietta, GA (US)

( * ) Notice: Subject to any disclaimer, the term of this patent is extended or adjusted under 35 U.S.C. 154(b) by 0 days.

(21) Appl. No.: 14/324,384

(22) Filed: Jul. 7, 2014

(65) Prior Publication Data
US 2014/0321907 A1    Oct. 30, 2014

Related U.S. Application Data

(63) Continuation-in-part of application No. 13/723,768, filed on Dec. 21, 2012, now abandoned.

(51) Int. Cl.
| | |
|---|---|
| *F16B 37/00* | (2006.01) |
| *B21D 35/00* | (2006.01) |
| *B21D 5/00* | (2006.01) |
| *B21D 53/36* | (2006.01) |
| *B21D 5/01* | (2006.01) |
| *F16B 37/02* | (2006.01) |

(52) U.S. Cl.
CPC ............... *F16B 37/00* (2013.01); *B21D 5/00* (2013.01); *B21D 5/01* (2013.01); *B21D 35/001* (2013.01); *B21D 53/36* (2013.01); *F16B 37/02* (2013.01); *Y10T 403/56* (2015.01)

(58) Field of Classification Search
USPC ................ 403/79, 150, 154, 155, 156–159
See application file for complete search history.

(56) References Cited

U.S. PATENT DOCUMENTS

| | | | | |
|---|---|---|---|---|
| 879,384 | A * | 2/1908 | Hillman ................. | 188/197 |
| 1,502,133 | A * | 7/1924 | Anderson ............... | 29/896.7 |
| 1,553,060 | A * | 9/1925 | Anderson ............... | 29/896.7 |
| 1,784,966 | A * | 12/1930 | Johnson ................. | 228/155 |
| 1,925,119 | A * | 9/1933 | Summerhays ......... | 72/371 |
| 2,067,283 | A * | 1/1937 | Padgett .................. | 464/134 |
| 2,609,861 | A * | 9/1952 | Otterson ................ | 72/414 |
| 3,687,488 | A * | 8/1972 | Tabor .................... | 403/59 |
| 3,711,134 | A | 1/1973 | Goldberg | |
| 3,901,048 | A * | 8/1975 | Pitner ..................... | 464/134 |
| 4,366,891 | A * | 1/1983 | Maruyama ............. | F16D 25/12 192/109 F |
| 4,548,016 | A | 10/1985 | Dubich et al. | |
| 4,643,279 | A * | 2/1987 | Skurka ................... | 188/79.55 |
| 4,702,100 | A * | 10/1987 | Levine .................. | B21D 35/00 29/896.7 |
| 5,419,043 | A * | 5/1995 | Laue ...................... | 29/897.2 |
| 5,689,231 | A * | 11/1997 | Olson .................... | 340/453 |
| 5,762,165 | A * | 6/1998 | Crewson ................ | 188/1.11 W |
| 5,881,514 | A | 3/1999 | Pryor | |
| 6,974,634 | B2 | 12/2005 | Cless et al. | |
| 7,997,599 | B2 * | 8/2011 | Zmyslowski .......... | B60G 11/16 280/124.134 |
| 2010/0223974 | A1 | 9/2010 | Kucinski et al. | |

* cited by examiner

*Primary Examiner* — Victor MacArthur
(74) *Attorney, Agent, or Firm* — Simpson & Simpson, PLLC

(57) ABSTRACT

A clevis including: bridge portion; a neck portion extending from the bridge portion in a first axial direction; a threaded opening passing through the bridge and neck portions through which a longitudinal axis passes; and first and second folded sidewalls extending from the bridge portion in a second axial direction, opposite the first axial direction. The first side wall includes: a first portion at a first distance, in a radial direction orthogonal to the longitudinal axis, from the longitudinal axis; and a second portion at a second distance, in the radial direction, less than the first distance, from the longitudinal axis and including at least one hole. The second side wall includes: a third portion at the first distance, in the radial direction, from the longitudinal axis; and a fourth portion at the second distance, in the radial direction, from the longitudinal axis and including at least one hole.

8 Claims, 12 Drawing Sheets

STAMPED CLEVIS

CROSS REFERENCE TO RELATED APPLICATIONS

This is a continuation-in-part patent application under 35 USC 120 of U.S. patent application Ser. No. 13/723,768, filed Dec. 21, 2012, which application is incorporated herein by reference.

TECHNICAL FIELD

The present disclosure relates to a clevis for an air brake application stamped from low carbon steel, in particular, a clevis with a threaded portion having sufficient length and thickness to increase the durability of the clevis and a reduced width at a distal end.

BACKGROUND

In general, devises for air brake operations include a threaded portion for connecting to an air brake system, for example for a motor vehicle. For example, the clevis is attached to an air cylinder by means of threaded rod engaged with a threaded opening in the base of the U-shaped clevis. The rod is adjustable on the road to enable the clevis to be positioned for proper function of the automatic brake adjuster mechanism. Operation of the vehicle places large stresses and destructive loads on the clevis. For example, a typical air chamber associated with an air brake system has an area of 30 sq. in. and is operated at air pressures up to 120 psi. This produces forces of approximately 3,600 lbs force on the clevis threaded joint. Engineering tests and field testing have demonstrated that a clevis must have a minimum of 0.500 inch of thread engagement with the rod to provide adequate threaded joint integrity under the duty cycles noted above. If the threaded attachment between the air chamber rod and the clevis fails, the braking ability of the vehicle is reduced.

It is known to fabricate a clevis with a simple U-shape for an air brake application by casting. However, casting is a relatively slow and expensive operation. For example, a mold must be formed, the actual casting and cooling requires a relatively long time span, and finishing operations are needed to remove imperfections inherent in the casting process. In addition, the casting process inherently produces unusable product, further increasing cost and time. Further, casting operations have undesirable environmental impacts associated with high energy usage, air and water emissions, and disposal of hazardous materials used in the molding and casting operations. Finally, casting constraints limit shapes, for example, more complicated internal configurations, that can be produced by casting operations.

It is known to fabricate a clevis by stamping steel approximately 0.24-0.25 inches thick. The stamped clevis has had the same simple "U" shape as the cast clevis with a threaded opening in the base of the "U" shape. However, when the threaded rod is engaged with the threaded opening in the base of the "U", the prior art stamped clevis design results in only 0.24-0.25 inches of thread engagement (the thickness of the piece from which the clevis is stamped and through which the threaded opening passes). This thread engagement length does not provide proper joint integrity and as a result a known clevis stamped from steel approximately 0.24-0.25 inches thick is not acceptable for use due to unacceptable joint durability.

It is known to fabricate a clevis by stamping steel approximately 0.24-0.25 inches thick with the same simple "U" shape as the cast clevis and having a smooth opening in the base of the "U" shape. In this case, the rod extending out of the air chamber passes through the opening and is welded to the clevis to provide the required joint strength for the clevis to rod interface. However, the welded joint precludes any adjustment of the rod with respect to the clevis and increases the cost and complexity of the clevis and air system interface.

SUMMARY

According to aspects illustrated herein, there is provided a clevis for an air brake assembly, including: a longitudinal axis; a bridge portion; a neck portion extending from the bridge portion in a first axial direction parallel to the longitudinal axis; a threaded opening passing through the bridge and neck portions, wholly surrounded by material forming the clevis, and through which the longitudinal axis passes; a first folded side wall extending from the bridge portion in a second axial direction opposite the first axial direction, the first folded side wall including a first portion at a first distance, in a radial direction orthogonal to the longitudinal axis, from the longitudinal axis and a second portion at a second distance, in the radial direction, less than the first distance, from the longitudinal axis and including at least one first hole passing through the material and wholly surrounded by the material; and a second folded side wall extending from the bridge portion in the second axial direction, the second folded side wall including a third portion at the first distance, in the radial direction, from the longitudinal axis; and a fourth portion at the second distance, in the radial direction, from the longitudinal axis; and including at least one second hole passing through the material and wholly surrounded by the material.

According to aspects illustrated herein, there is provided a clevis for an air brake assembly, including: a longitudinal axis; a bridge portion; a neck portion extending from the bridge portion in a first axial direction parallel to the longitudinal axis; a threaded opening passing through the bridge and neck portions and wholly surrounded by material forming the clevis, through which the longitudinal axis passes and including a diameter; a first folded side wall extending from the bridge portion in a second axial direction opposite the first axial direction, the first folded side wall including a first portion directly connected to the bridge portion and including a first inner surface facing the longitudinal axis and a second portion forming a distal end of the first folded side wall and including a second inner surface facing the longitudinal axis and at least one first hole passing through the material and wholly surrounded by the material and a second folded side wall extending from the bridge portion in the second axial direction, the second folded side wall including a third portion directly connected to the bridge portion and including a third inner surface facing the first inner surface and separated, in a radial direction orthogonal to the longitudinal axis, from the first inner surface by a first distance greater than or substantially equal to the diameter of the threaded opening and a fourth portion forming a distal end of the second folded side wall, the fourth portion including a fourth inner surface facing the second inner surface, separated from the second inner surface, in the radial direction, by a second distance substantially equal to or less than the diameter of the threaded opening and at least one second hole passing through the material and wholly surrounded by the material.

According to aspects illustrated herein, there is provided a method of stamping a clevis for an air brake assembly, including: stamping a sheet of steel to form a planar blank, the planar blank including a first longitudinal axis passing through first and second longitudinal ends, first and second oppositely facing planar surfaces, a central portion with a uniform width orthogonal to the first longitudinal axis, a first portion extending from the central portion along the first longitudinal axis in a first direction and separated from the central portion by a first line orthogonal to the first longitudinal axis, a second portion extending from the first portion the first longitudinal end in the first direction and separated from the first portion by a second line orthogonal to the first longitudinal axis, a third portion extending from the central portion along the first longitudinal axis in a second direction, opposite the first direction, and separated from the central portion by a third line orthogonal to the first longitudinal axis and a fourth portion extending from the third portion the second longitudinal end in the second direction and separated from the third portion by a fourth line orthogonal to the first longitudinal axis; piercing the blank to form at least one first hole between a center point of the first longitudinal axis and the first longitudinal end and connecting the first and second surfaces and at least one second hole between the center point of the first longitudinal axis and the second longitudinal end and connecting the first and second surfaces; extruding the blank to form a ring-shaped neck centered on the first longitudinal axis, the neck including a third hole and extending from the central portion and the second planar surface in a third direction parallel to a second longitudinal axis passing through the third hole, the second longitudinal axis orthogonal to the first longitudinal axis and the first and second planar surfaces; bending the blank along the second line such that the second portion is offset from the first portion in a fourth direction, opposite the third direction. The blank along the fourth line such that the fourth portion is offset from the third portion in the fourth direction, the blank along the first line such that the first and second portions extend from the central portion in the fourth direction and the blank along the second line such that the third and fourth portions extend from the central portion in the fourth direction; and, threading an inner circumferential surface of the third hole.

According to aspects illustrated herein, there is provided a clevis for an air brake assembly, including: a longitudinal axis; a bridge portion; a neck portion extending from the bridge portion in a first axial direction parallel to the longitudinal axis; a threaded opening passing through the bridge and neck portions, wholly surrounded by material forming the clevis, and through which the longitudinal axis passes; a first folded side wall extending from the bridge portion in a second axial direction opposite the first axial direction, the first folded side wall including a first portion, directly connected to the bridge portion, at a first distance, in a radial direction orthogonal to the longitudinal axis, from the longitudinal axis and a second portion, forming a distal end of the first folded side at a second distance, in the radial direction, greater than the first distance, from the longitudinal axis and including at least one first hole passing through the material and wholly surrounded by the material; and a second folded side wall extending from the bridge portion in the second axial direction, the second folded side wall including a third portion, directly connected to the bridge portion, at the first distance, in the radial direction, from the longitudinal axis and a fourth portion, forming a distal end of the second folded side wall at the second distance, in the radial direction, from the longitudinal axis; and including at least one second hole passing through the material and wholly surrounded by the material.

According to aspects illustrated herein, there is provided a method of stamping a clevis for an air brake assembly, including: stamping a sheet of steel to form a planar blank, the planar blank including a first longitudinal axis passing through first and second longitudinal ends, first and second oppositely facing planar surfaces, a central portion with a uniform width orthogonal to the first longitudinal axis, a first portion extending from the central portion along the first longitudinal axis in a first direction and separated from the central portion by a first line orthogonal to the first longitudinal axis, a second portion extending from the first portion toward the first longitudinal end in the first direction and separated from the first portion by a second line orthogonal to the first longitudinal axis, a third portion extending from the central portion along the first longitudinal axis in a second direction, opposite the first direction, and separated from the central portion by a third line orthogonal to the first longitudinal axis, and a fourth portion extending from the third portion toward the second longitudinal end in the second direction and separated from the third portion by a fourth line orthogonal to the first longitudinal axis; piercing the blank to form at least one first hole between a center point of the first longitudinal axis and the first longitudinal end and connecting the first and second surfaces and at least one second hole between the center point of the first longitudinal axis and the second longitudinal end and connecting the first and second surfaces; extruding the blank to form a ring-shaped neck centered on the first longitudinal axis, the neck including a third hole and extending from the central portion and the second planar surface in a third direction parallel to a second longitudinal axis passing through the third hole, the second longitudinal axis orthogonal to the first longitudinal axis and the first and second planar surfaces; bending the blank along the second line such that the second portion is offset from the first portion in the third direction, the fourth line such that the fourth portion is offset from the third portion in the third direction, the first line such that the first and second portions extend from the central portion in a fourth direction, opposite the third direction and the second line such that the third and fourth portions extend from the central portion in the fourth direction; and threading an inner circumferential surface of the third hole.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
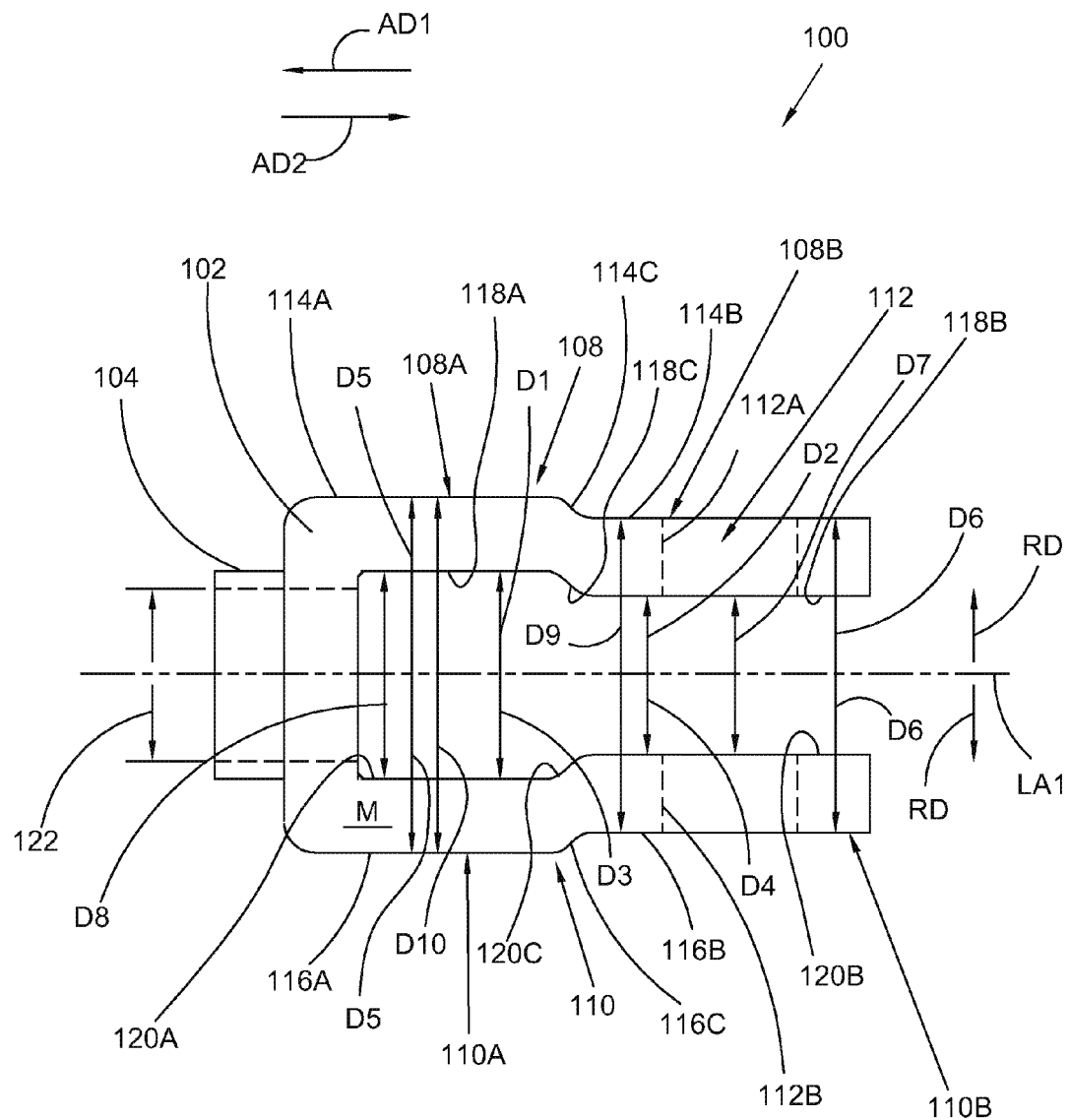
FIG. 1 is a plan view of a stamped clevis with two openings.

FIG. 1 is a plan view of a stamped clevis 100 with two openings.

Figure 2:
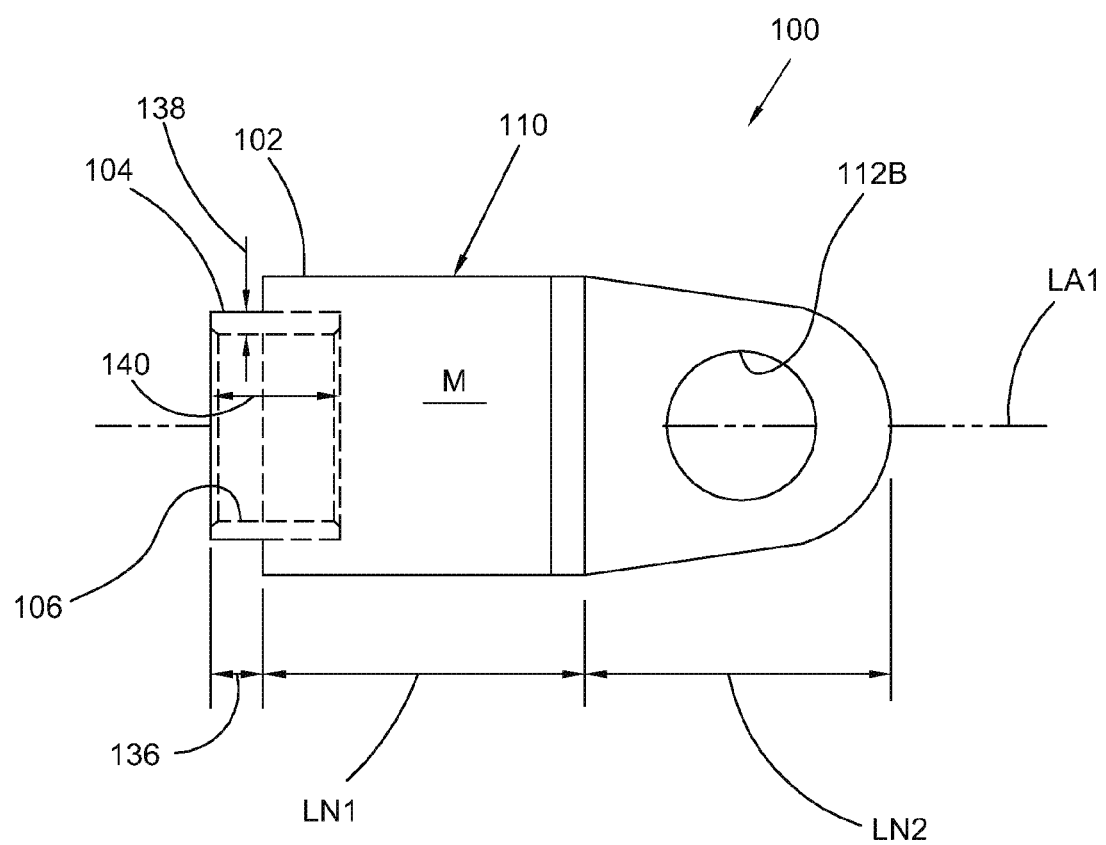
FIG. 2 is a side view of the stamped clevis of FIG. 1.

FIG. 2 is a side view of stamped clevis 100 of FIG. 1.

Figure 3:
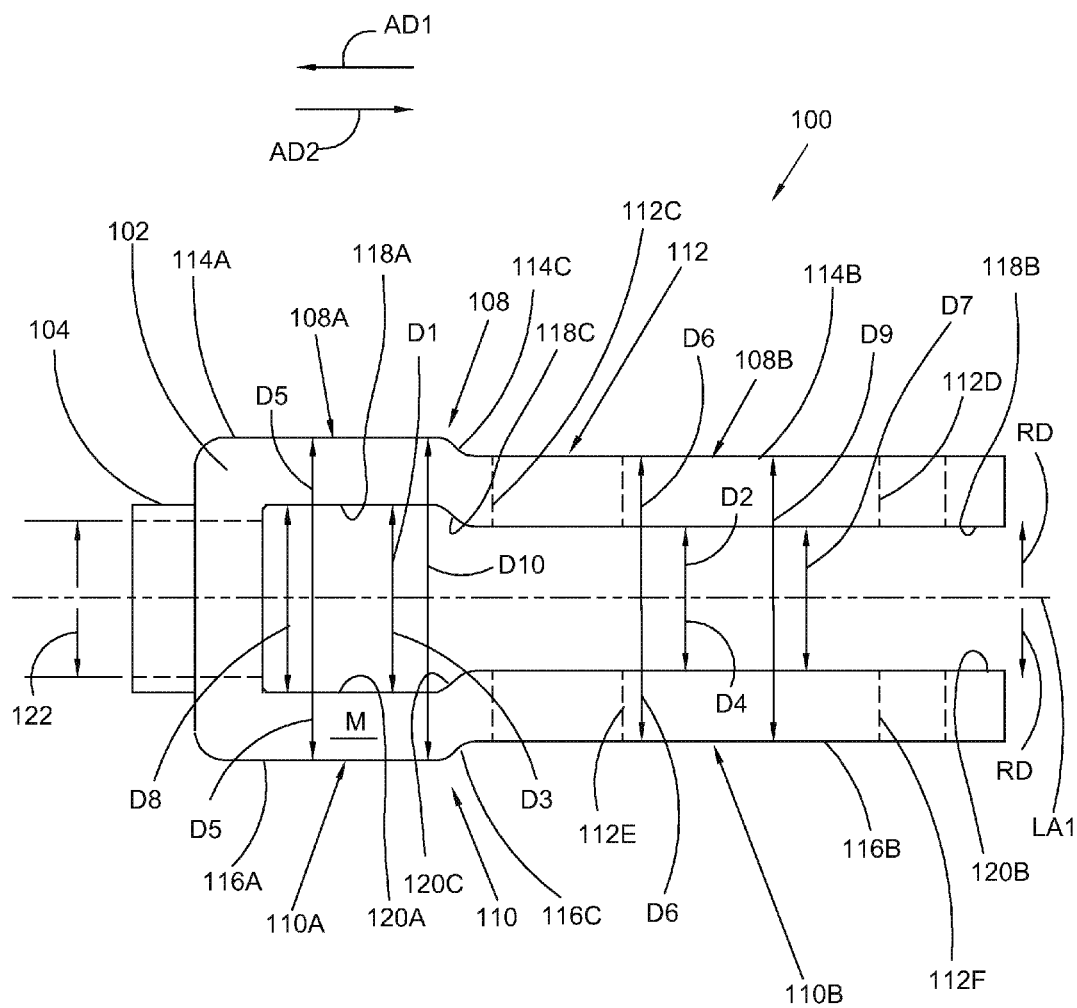
FIG. 3 is a plan view of a stamped clevis with four openings.

FIG. 3 is a plan view of stamped clevis 100 with four openings.

Figure 4:
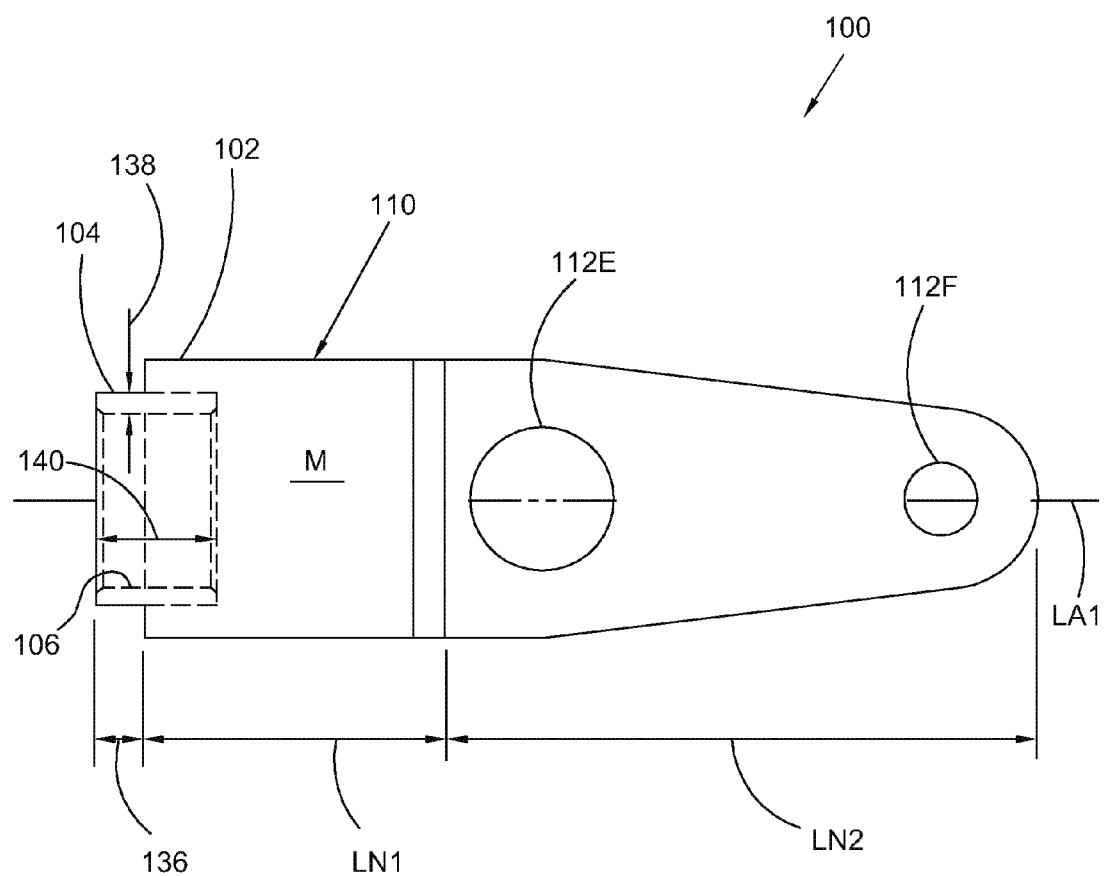
FIG. 4 is a side view of the stamped clevis of FIG. 3.

FIG. 4 is a side view of stamped clevis 100 of FIG. 3.

Figure 5:
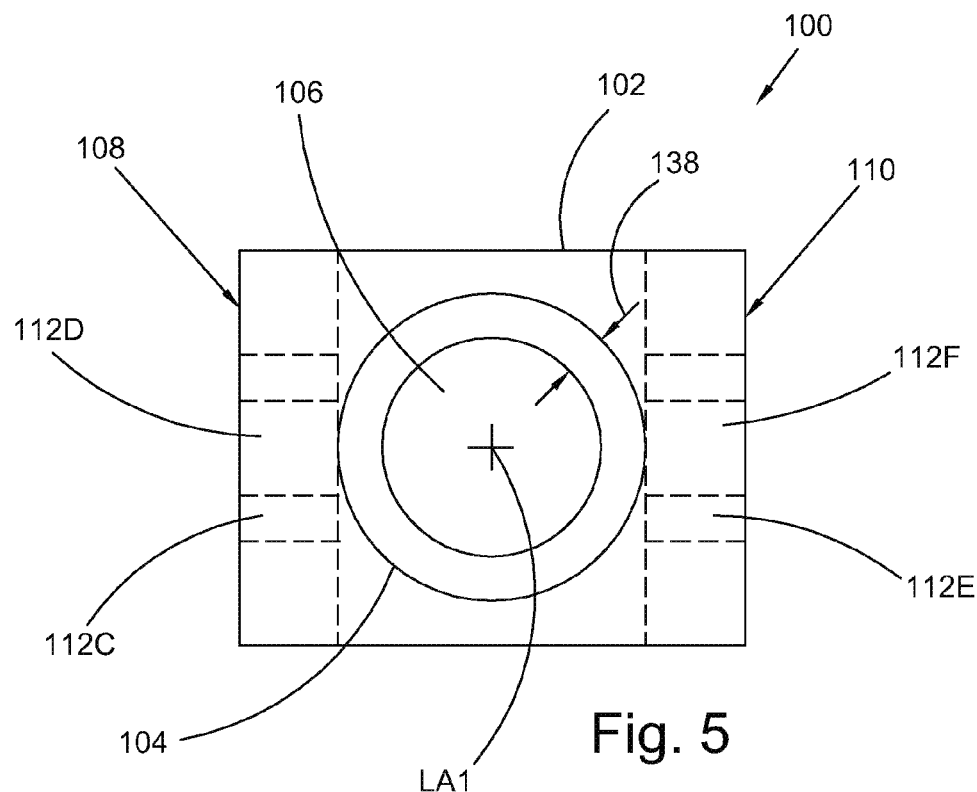
FIG. 5 is an end view of the stamped clevis of FIGS. 3 and 4.

FIG. 5 is an end view of stamped clevis 100 of FIGS. 3 and 4.

FIGS. 6A, 6B, 6C, and 6D are respective plan views of stamped clevis 100 showing example configurations. The following should be viewed in light of FIGS. 1 through 6D. Stamped clevis 100 for an air brake assembly includes longitudinal axis LA, bridge portion 102, neck portion 104 extending from bridge portion 102 in axial direction AD1 parallel to longitudinal axis LA, and threaded opening 106 passing though portions 102 and 104. Longitudinal axis LA1 passes through opening 106. Opening 106 is wholly surrounded by material M forming clevis 100. Clevis 100 includes folded sidewalls 108 and 110 extending from portion 104 in axial direction AD2, opposite direction AD1.

Side wall 108 includes portion 108A at distance D1, in radial direction RD orthogonal to longitudinal axis LA1, from longitudinal axis LA1, and portion 108B a distance D2 in radial direction RD from longitudinal axis LA1. Distance D2 is less than distance D1. Side wall 110 includes portion 110A at distance D3, in radial direction RD from longitudinal axis LA1, and portion 110B a distance D4 in radial direction RD from longitudinal axis LA1. Distance D4 is less than distance D3. In an example embodiment, D1 is equal to D3 and D2 is equal to D4.

Portions 108B and 110B each include at least one opening 112. In the example embodiment of FIGS. 1 and 2, portion 108B includes opening 112A and portion 110B includes opening 112B. In the example embodiment of FIGS. 3 and 4, portion 108B includes openings 112C and 112D and portion 110B includes openings 112E and 112F. Openings 112A through 112F are wholly surrounded by material M. In an example embodiment, openings 112A, 112B, 112C and 112E have the same diameter. In an example embodiment, openings 112A and 112B are aligned in radial direction RD. In an example embodiment, openings 112C and 112E are aligned in radial direction RD and openings 112D and 112F are aligned in radial direction RD.

Portions 108A and 110A are directly connected to bridge portion 102 and face each other in radial direction RD. Portions 108B and 110B form respective distal ends of side walls 108 and 110, respectively, and face each other in radial direction RD. In an example embodiment, the respective diameters for openings 112C and 112E are larger than the respective diameters for openings 112D and 112F.

Portions 108A and 108B include outer surfaces 114A and 114B, respectively, facing away from longitudinal axis LA1. Portions 110A and 110B include outer surfaces 116A and 116B, respectively, facing away from longitudinal axis AL. Surfaces 114B and 116B extend to the respective distal ends of side walls 108 and 110, respectively. Side wall 108 includes curved surface 114C continuous with and connecting surfaces 114A and 114B and side wall 110 includes curved surface 116C continuous with and connecting surfaces 116A and 116B. Surfaces 114A and 116A are at distance D5 from longitudinal axis LA1 and surfaces 114B and 116B are at distance D6 from longitudinal axis LA1. Distance D6 is less than distance D5. In an example embodiment, distance D9 is twice distance D6. In an example embodiment, distance D10 is twice distance D5.

Portions 108A and 108B include inner surfaces 118A and 118B, respectively, facing longitudinal axis LA1. Portions 110A and 110B include inner surfaces 120A and 120B, respectively, facing longitudinal axis LA1. Surfaces 118B and 120B extend to the respective distal ends of side walls 108 and 110, respectively. Side wall 108 includes curved surface 118C continuous with and connecting surfaces 118A and 118B and side wall 110 includes curved surface 120C continuous with and connecting surfaces 120A and 120B. Surfaces 118A and 120A are at distances D1 and D3, respectively, from longitudinal axis LA1 and surfaces 118B and 120B are at distances D2 and D4, respectively, from longitudinal axis LA1. Distances D2 and D4 are less than distances D1 and D3, respectively. As seen in FIGS. 1 and 3, at least respective portions of surfaces 114C and 118C overlap in radial direction RD.

In an example embodiment, surfaces 108A and 110A are parallel. In an example embodiment, surfaces 108B and 110B are parallel.

Figure 6A:
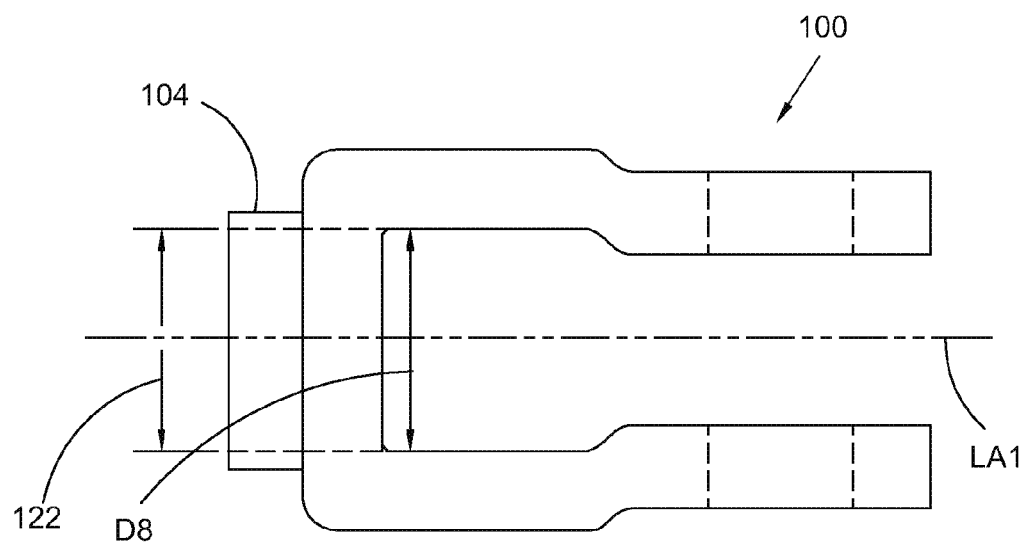
FIGS. 6A, 6B, 6C, and 6D are respective plan views of a stamped clevis showing example configurations.
Figure 6B:
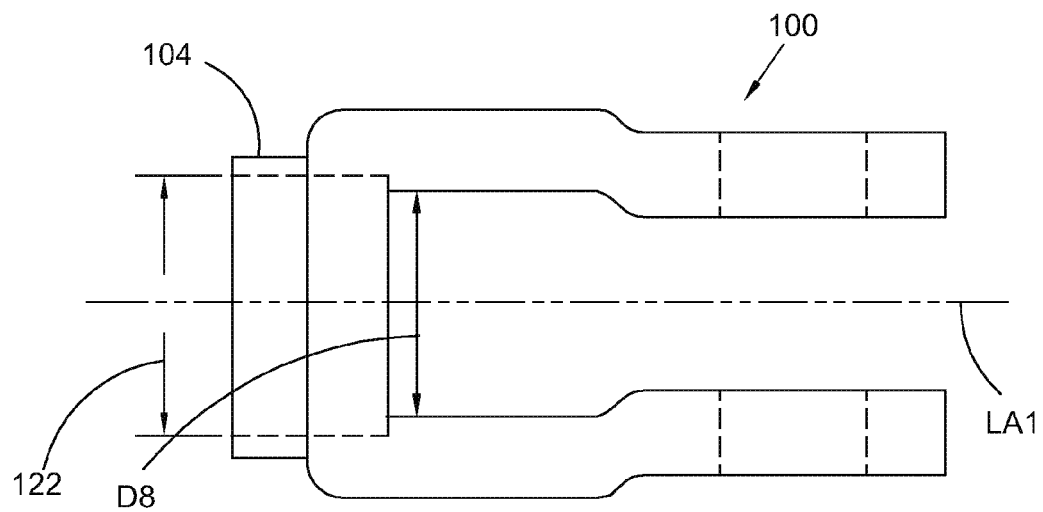

Threaded opening has diameter 122, for example centered about longitudinal axis LA1. Inner surfaces 118A and 120A are separated by distance D8 in radial direction RD. In an example embodiment, for instance as shown in FIGS. 1 and 3, distance D8 is greater than diameter 122. In an example embodiment, for instance as shown in FIG. 6A, distance D8 is substantially equal to diameter 122. In an example embodiment, for instance as shown in FIG. 6B, distance D8 is less than diameter 122.

Figure 6C:
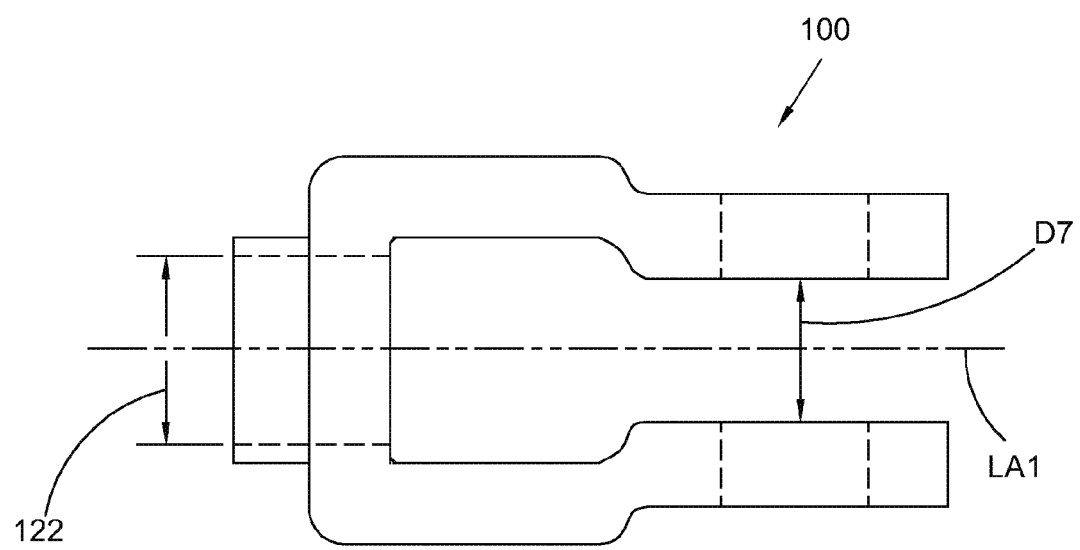
Figure 6D:
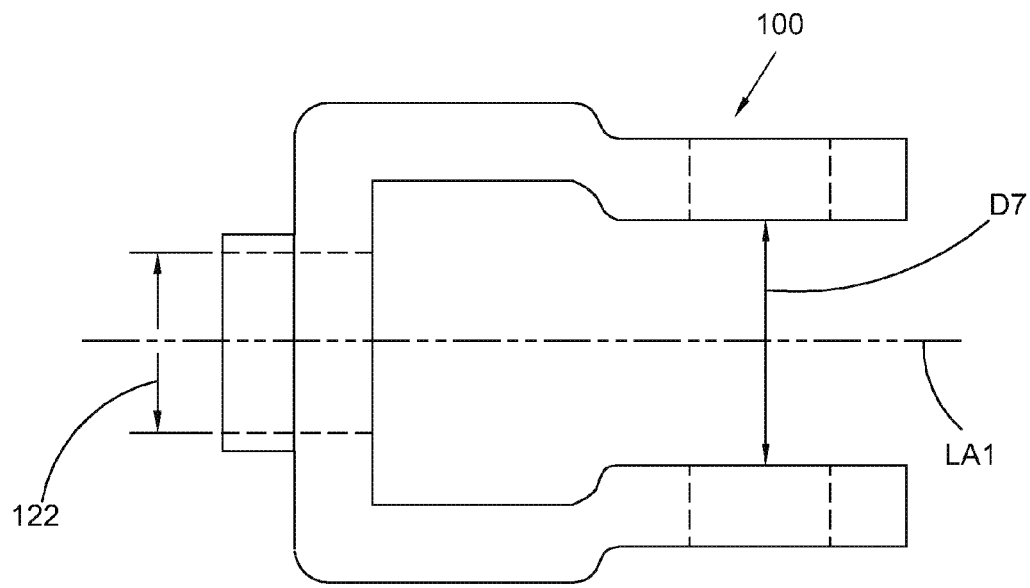

Inner surfaces 118B and 120B are separated by distance D7 in radial direction RD. In an example embodiment, for instance as shown in FIGS. 1 and 3, distance D7 is substantially equal to diameter 122. In an example embodiment, for instance as shown in FIG. 6C, distance D7 is less than diameter 122. In an example embodiment, for instance as shown in FIG. 6D, distance D7 is greater than diameter 122.

In an example embodiment, portions 108A and 110A have length LN1 in axial direction AD1 and portions 108B and 110B have length LN2, greater than or equal to length LN1, in axial direction AD1. In an example embodiment, portions 108A and 110A have length LN1 in axial direction AD1 and portions 108B and 110B have length LN2, less than or equal to length LN1, in axial direction AD1.

Figure 7:
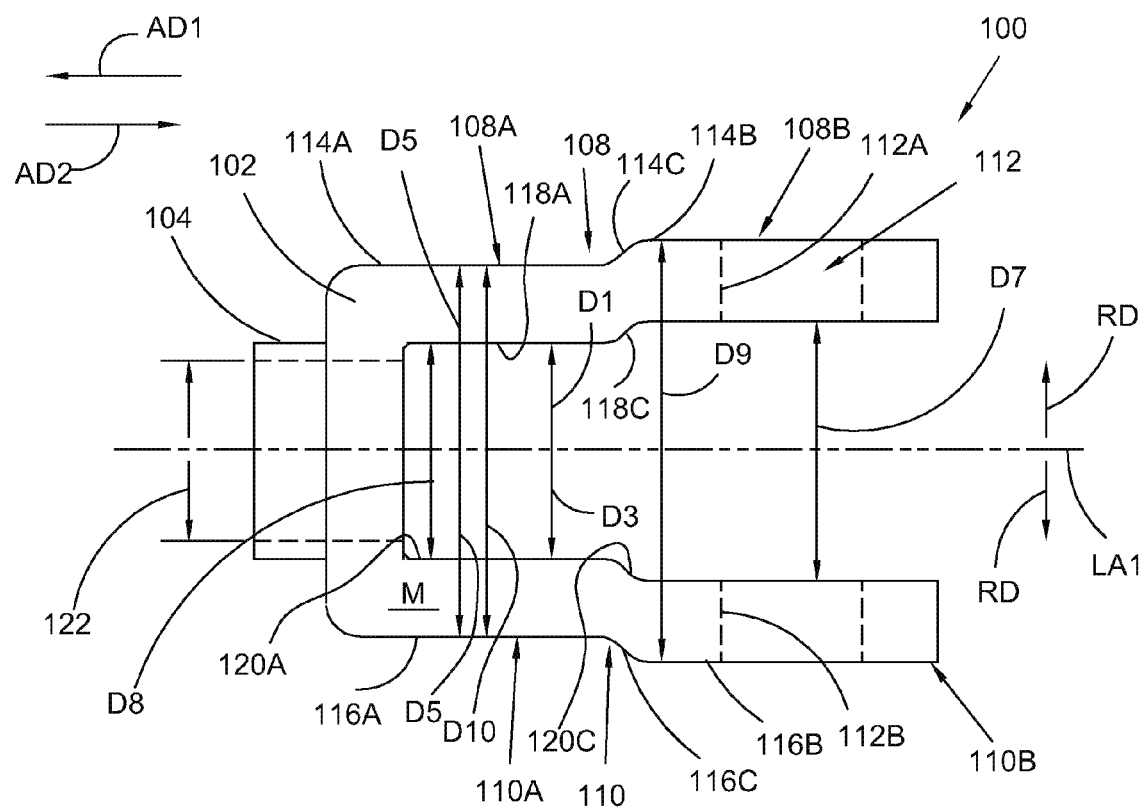
FIG. 7 is a plan view of a stamped clevis with two openings.

FIG. 7 is a plan view of stamped clevis 100. In general, the discussion for clevis 100 in FIGS. 1 through 6D is applicable to clevis 100 in FIG. 7 except as follows. In the example embodiment of FIG. 7, distance D7 is greater than distance D8 and distance D9 is greater than distance D10. In FIG. 7, distance D7 is greater than diameter 122.

Figure 8:
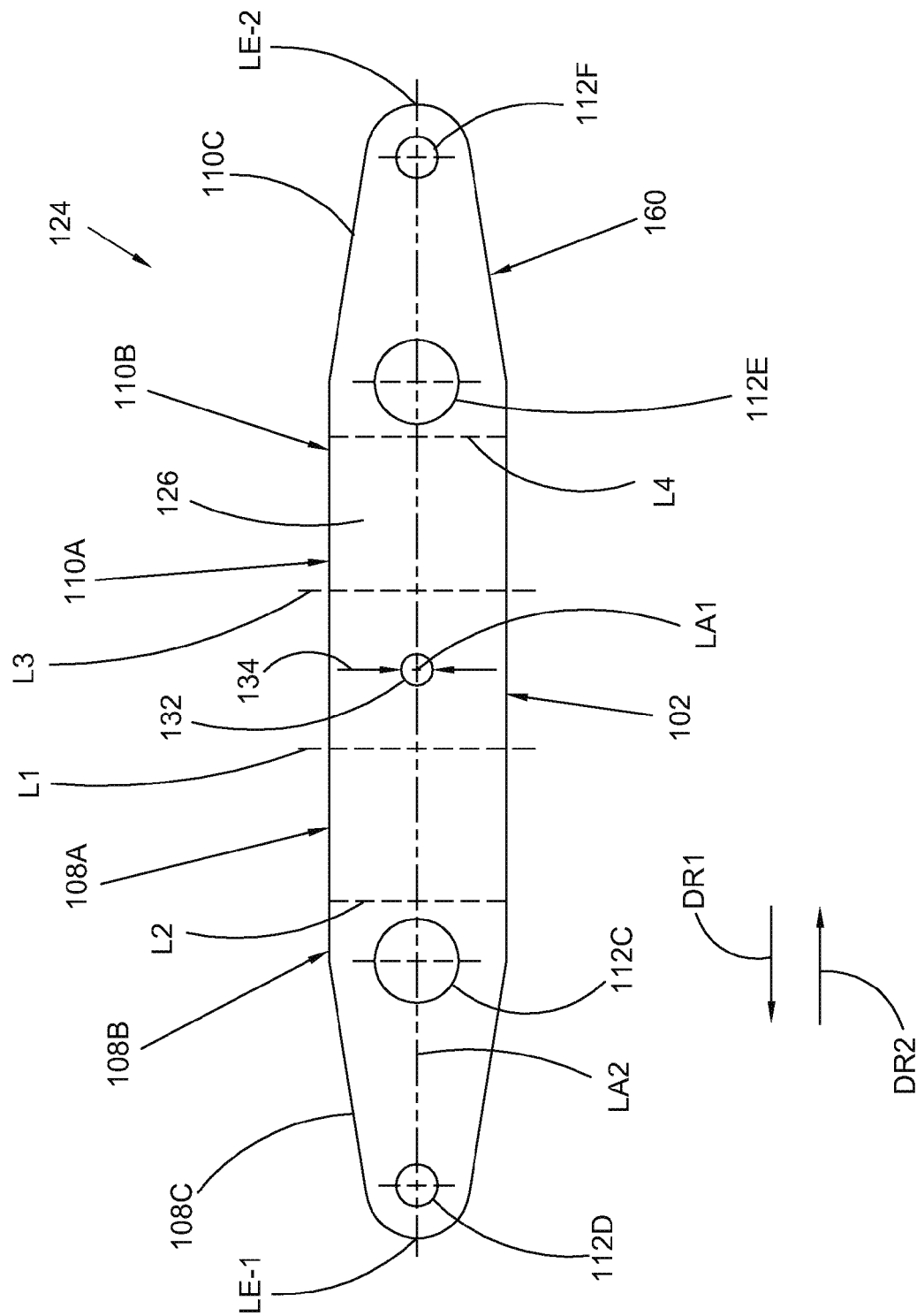
FIG. 8 is a plan view of a blank for a stamped clevis formed from a piece of steel.

FIG. 8 is a plan view of blank 124 for stamped clevis 100 formed from a piece of steel.

Figure 9:
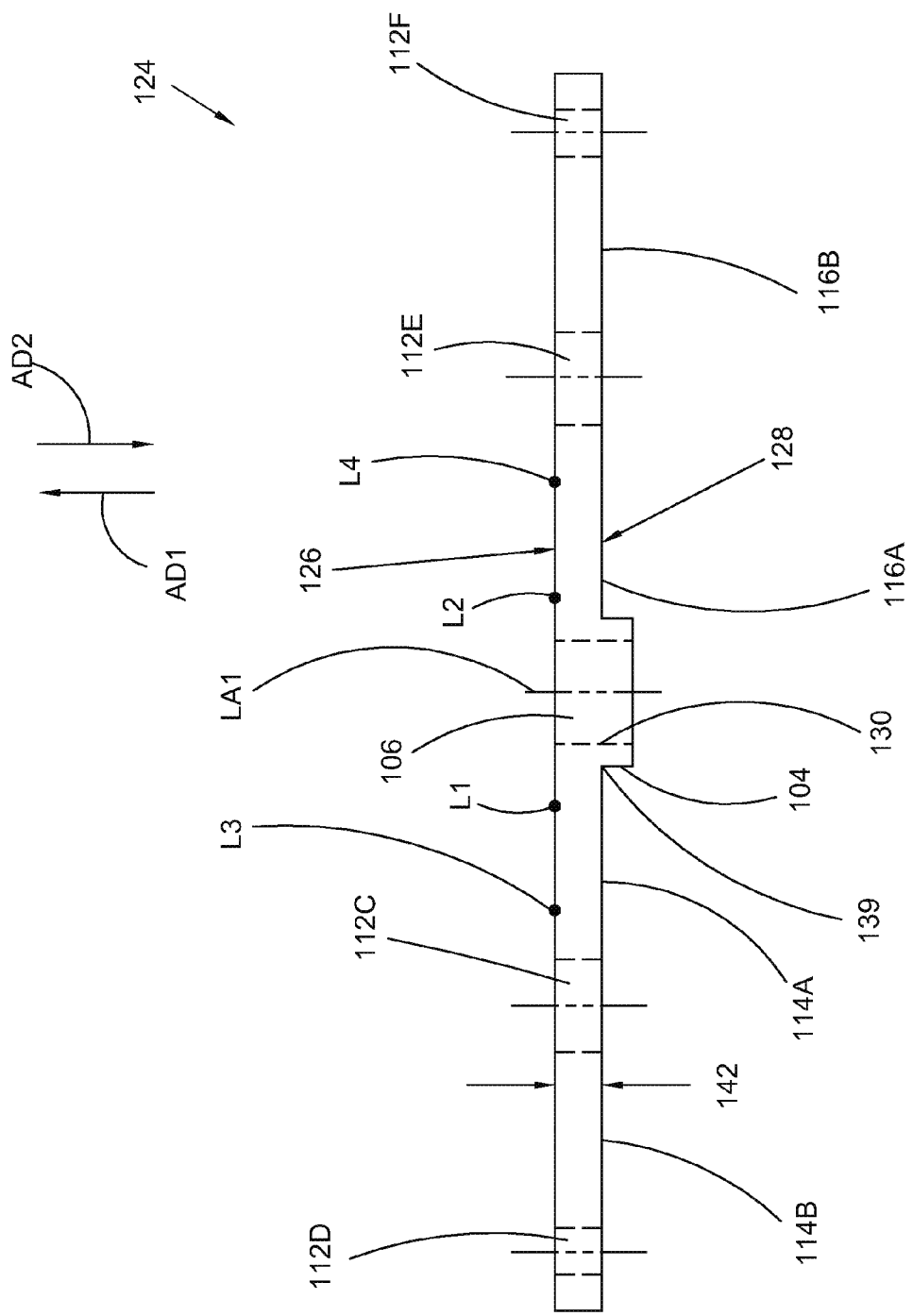
FIG. 9 is a view of the blank of FIG. 8 with pierced holes and extruded neck portion.

FIG. 9 is a view of blank 124 of FIG. 8 with pierced holes and extruded neck portion.

Figure 10:
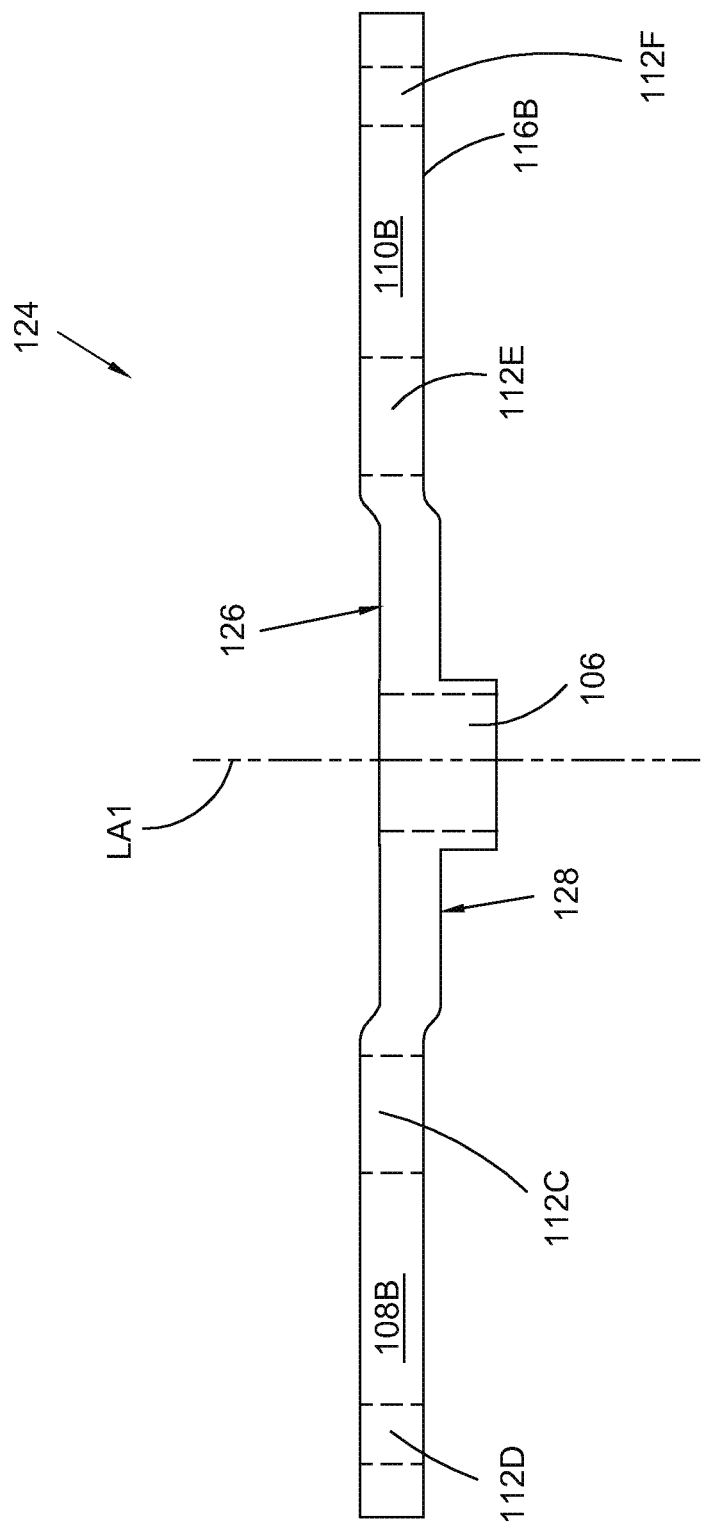
FIG. 10 is a side view of the blank of FIG. 8 showing bent distal portions of side walls; and, FIG. 11 is a side view of a clevis formed from the blank of FIG. 8; and, FIG. 12 is a plan view of a clevis according to the parent application for the instant application, U.S. patent application Ser. No. 13/723,768.

FIG. 10 is a side view of blank 124 of FIG. 8 showing bent distal portions of side walls.

Figure 11:
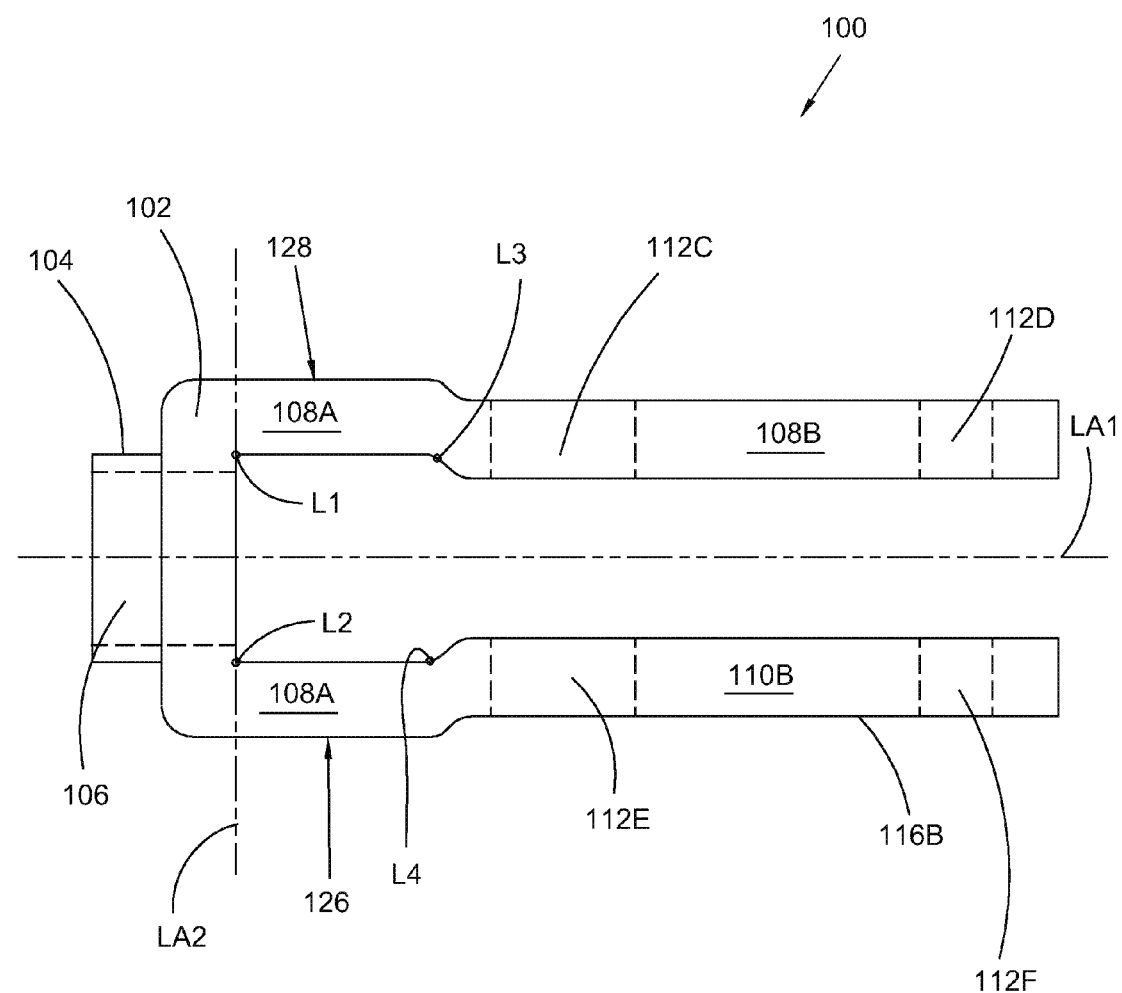

FIG. 11 is a side view of clevis 100 formed from blank 124 of FIG. 8. FIGS. 8 through 11 illustrate a method of stamping clevis 100 for an air brake assembly. Although the method is presented in a particular number and sequence of steps, it should be understood that the method is not limited to the number of sequence presented. A first step stamps a sheet of steel to form planar blank 124. Planar blank includes: longitudinal axis LA2 passing longitudinal ends LE-1 and LE-2; oppositely facing planar surfaces 126 and 128; bridge portion 102 with uniform width W orthogonal to longitudinal axis LA2; portion 108A extending from portion 102 along longitudinal axis LA2 in direction DR1 and separated from portion 102 by line L1 orthogonal to longitudinal axis LA2; portion 108B extending from portion 108A to longitudinal end LE-1in direction DR1 and separated from portion 108A by line L2 orthogonal to longitudinal axis LA2; portion 110A extending from portion 102 along longitudinal axis LA2 in direction DR2 and separated from portion 102 by line L3 orthogonal to longitudinal axis LA2; and, portion 110B extending from portion 110A in direction DR2 to longitudinal axis LA2 and separated from portion 110A by line L4 orthogonal to axis LA2. In an example embodiment, part 108C of portion 108B tapers toward longitudinal end LE-1. In an example embodiment, part 110C of portion 110B tapers toward longitudinal end LE-2.

A second step pierces blank 124 to form: at least one hole 112 between longitudinal axis LA1, which is orthogonal to longitudinal axis LA2 and bisects longitudinal axis LA2, and longitudinal end LE-1, and connects surfaces 126 and 128; and at least one hole 112 between longitudinal axis LA1 and longitudinal end LE-2 and connecting surfaces 126 and 128. In an example, embodiment, holes 112A and 112B are pierced. In an example, embodiment, holes 112C-F are pierced.

A third step extrudes blank 124 to form ring-shaped neck portion 104 centered on longitudinal axis LA1. Portion 104 includes hole 106 and extends from portion 102 and planar surface 126 in axial direction AD2.

A fourth step bends: blank 124 along line L2 such that portion 108B is offset from portion 108A in direction AD1; blank 124 along line L4 such that portion 110B is offset from portion 110A in direction AD1; blank 124 along the line L1 such that portions 108A and 108B extend from portion 102 in direction AD1; and blank 124 along the line L2 such that portions 110A and 110B extend from portion 102 in direction AD1. A fifth step threads inner circumferential surface 130 of hole 106.

In an example embodiment, a sixth step punches opening 132, for example, centered on longitudinal axis LA1, and having diameter 134 less than diameter 122 prior to extruding ring-neck portion 104. Punching opening 132 results in maximizing extrusion height 136 while maintaining evenness in the formation of neck portion 104, for example, thickness 138 is substantially consistent throughout height 136. Punching hole 132 also results in consistent perpendicularity of hole 106 with respect to holes 112. Moreover, punching hole 132 assists with and/or guides the extrusion punch thereby providing more consistent results on the formed portion and increasing the length of the extrusion area. Furthermore, a slight radius may be provided on the entry portion of the extrusion punch which assists with the release of clevis 100 after the extrusion operation. Corner 139 in FIG. 9 is shown as square; however, it should be understood that corner 139 can be rounded, for example, formed with a radius.

Portions 108A and 110A include outer surfaces 114A and 116A, respectively, formed by planar surface 128. Portions 108B and 110B include outer surfaces 114B and 116B, respectively, formed by planar surface 128. Bending blank 124 along lines L1 and L3 includes: positioning outer surfaces 114A and 116A distance D10 from each other and positioning outer surfaces 114B and 116B distance D9 from each other. In an example embodiment, surfaces 108A and 110A are parallel. In an example embodiment, surfaces 108B and 110B are parallel.

Portions 108A and 110A include inner surfaces 118A and 120A, respectively, formed by planar surface 126. Portions 108B and 110B include inner surfaces 118B and 120B, respectively, formed by planar surface 126. Bending blank 124 along lines L1 and L3 includes: positioning inner surfaces 118A and 120A distance D8 from each other and positioning inner surfaces 118B and 120B distance D7 from each other.

In an example embodiment, D8 is less than D9. In an example embodiment, distance D8 is greater than diameter 122 of opening 106. In an example embodiment, distance D8 is substantially equal to diameter 122 of opening 106. In an example embodiment, distance D8 is less than diameter 122 of opening 106. In an example embodiment, distance D7 is substantially equal to diameter 122 of opening 106. In an example embodiment, distance D7 is less than diameter 122 of opening 106. In an example embodiment, distance D7 is greater than diameter 122 of opening 106.

In an example embodiment, a seventh step applies a corrosion-resistant metallic coating to blank 124 or to clevis 100 after the first through sixth steps are completed.

In an example embodiment (for example as shown in FIG. 7), the fourth step bends: blank 124 along line L2 such that portion 108B is offset from portion 108A in direction AD2; blank 124 along line L4 such that portion 110B is offset from portion 110A in direction AD2; blank 124 along the line L1 such that portions 108A and 108B extend from portion 102 in direction AD1; and blank 124 along the line L2 such that portions 110A and 110B extend from portion 102 in direction AD1.

Clevis 100 advantageously overcomes the problems noted above, associated with casting of a clevis. Stamped clevis 100 is robust, for example, clevis 100 provides the strength and durability of a cast clevis with the reduced cost, complexity, and ancillary impacts (discussed below) of stamping operations. For example, as noted above, it is necessary for thread engagement between a clevis and air chamber rod to be at least 0.500 inches. Advantageously, length 140 is at least 0.500 inches. For example, thickness 142 is approximately 7.0 mm and distance 136 is at least 5.7 mm. That is, the forming operation noted above advantageously results in neck 104 extending beyond portion 102 by height 136, increasing length 140 of threaded hole 106. Further, a majority of thickness 142 of the blank and side walls 108 and 110 is preserved in neck portion 104. For example, thickness 138 can be about ¾ of thickness 142. In an example embodiment, the positive contact between the mating (distal) surfaces of neck portion 104 and a locking nut (not shown) for a threaded rod (not shown) is improved by including a machining operation after the hole extrusion operation. Such machining operation may also be used to maintain an even formed height on the clevis. Thus, clevis 100 provides a structurally sound attachment joint for an air cylinder rod interface. Threaded opening 106 also enables the required adjustability of the clevis on the rod for proper brake system performance.

Further, stamping operations are much quicker and less expensive than casting operations. For example, fabricating cutting dies is relatively quick and inexpensive in comparison to the molding process needed for casting operations. The actual stamping operations are very quick. For some steps, such as cutting the blank and piercing holes, multiple units can operated at once with a single press. Thus, the time associated with stamping is less than that needed for pouring/casting and cooling.

Further still, finishing operations are very minimal for stamping operations in comparison to casting operations, for example, only nominal de-burring may be required. Stamping operations are much more controllable, predictable, and repeatable, resulting in a much lower rate of unusable product than casting operations. Finally, stamping operations have fewer environmental impacts. The nominal air and water emissions for stamping operations do not require the regulatory, control, and waste disposal activities required for casting operations. The energy needed to operate presses is less than the energy needed for casting. There are no hazardous or restricted waste products produced by stamping operations, as can be the case for casting processes. Any portions of the waste steel produced by the stamping operations can be readily used in other stamping operations or recycled.

It has been found that to perform the desired present invention extrusion processes, the raw material must flow very easily during the operation. To achieve the necessary flow characteristics, in an example embodiment, the carbon percentage is maintained at a low carbon level which does not exceed 0.15%. Components fabricated from material comprising greater than 0.15% carbon may result in crack development on the top area of the formed portion of the present invention clevis.

Figure 12:
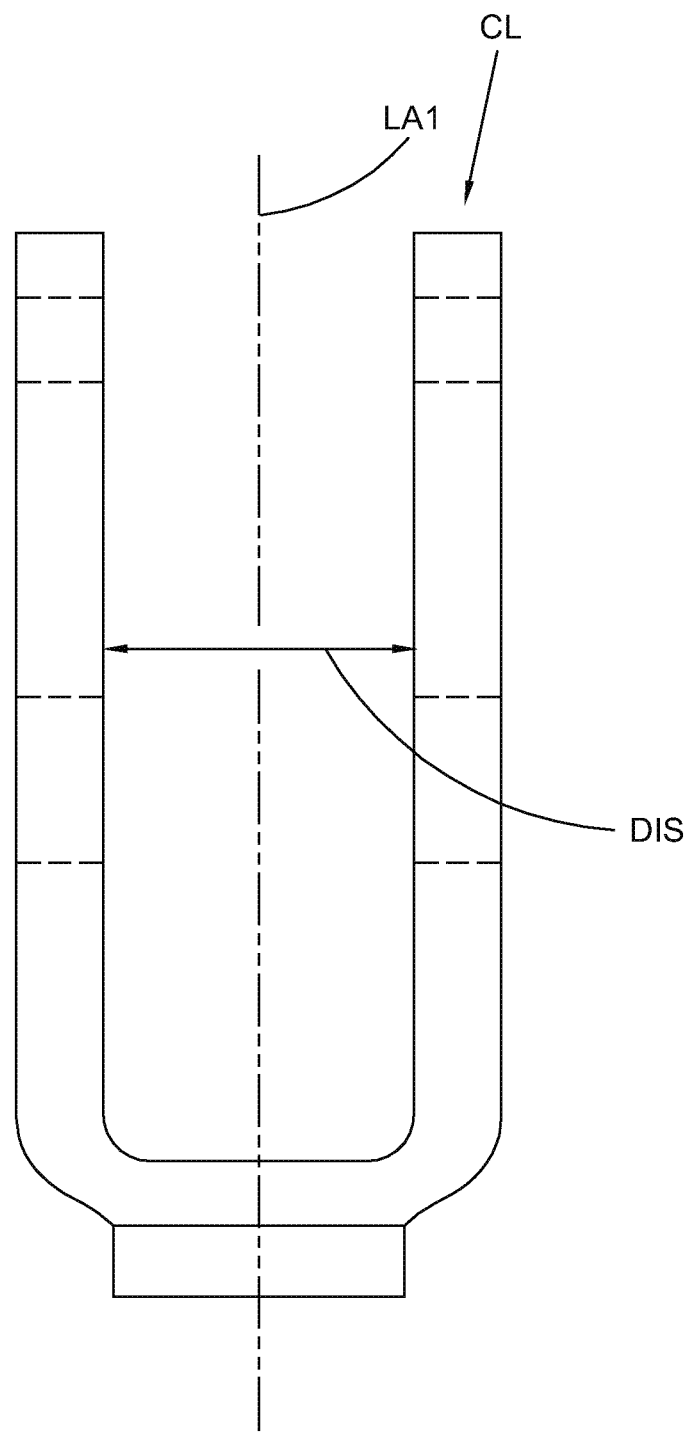

FIG. 12 is a plan view of clevis CL according to the parent application for the instant application, U.S. patent application Ser. No. 13/723,768. In general, pins (not shown) are used to connect equipment inserted between inner surfaces 118 and 120. In particular, the pins are disposed in openings 112A-112F, for example, a pin can be place through openings 112A and 112B and a piece of equipment. Typically, the width of the equipment to be inserted between surfaces 118 and 120 is slightly less than distance D7, to minimize twisting of the equipment within a clevis under load. Thus, clevis 100 advantageously provides the relatively snug fit needed to minimize the twisting noted above and enables the use of standard pins. Clevis 100 also provides advantages with respect to clevis CL. For example, in an example embodiment, distance DIS for clevis CL and distance D8 for clevis 100 are equal. Thus, clevis CL does not provide the desired snug fit noted above. However, via distance D7, clevis 100 does provide the desired snug fit.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A clevis for an air brake assembly, comprising:
a longitudinal axis;
a bridge portion;
a neck portion extending from the bridge portion in a first axial direction parallel to the longitudinal axis;
a threaded opening passing through the bridge and neck portions, wholly surrounded by material forming the clevis, and through which the longitudinal axis passes;
a first folded side wall extending from the bridge portion in a second axial direction opposite the first axial direction, the first folded side wall including a first portion, a second portion, a first curved surface, a second curved surface, and at least one first hole, wherein the first portion includes a first outer surface facing away from the longitudinal axis and at a first distance, in a radial direction orthogonal to the longitudinal axis, from the longitudinal axis, wherein the first portion includes a first inner surface facing the longitudinal axis, wherein the second portion includes a second outer surface facing away from the longitudinal axis and at a second distance, in the radial direction, less than the first distance, from the longitudinal axis wherein the second portion includes a second inner surface facing the longitudinal axis, wherein the at least one first hole passes through the second outer surface and the material and is wholly surrounded by the second portion and the material, wherein the first curved surface connects the first and second outer surfaces, wherein the second curved surface connects the first and second inner surfaces and wherein at least respective portions of the first and second curved surfaces overlap in the radial direction; and,
a second folded side wall extending from the bridge portion in the second axial direction, the second folded side wall including a third portion, a fourth portion, and at least one second hole, wherein the third portion includes a third outer surface facing away from the longitudinal axis and at the first distance, in the radial direction, from the longitudinal axis, wherein the fourth portion includes a fourth outer surface facing away from the longitudinal axis and at the second distance, in the radial direction, from the longitudinal axis and wherein the at least one second hole passes through the fourth outer surface and the material and is wholly surrounded by the fourth portion and the material.

2. The clevis of claim 1, wherein:
the first portion is directly connected to the bridge portion includes a first inner surface facing the longitudinal axis;
the second portion forms a distal end of the first sidewall and includes a second inner surface facing the longitudinal axis;
the third portion is directly connected to the bridge portion includes a third inner surface facing the longitudinal axis;
the fourth portion forms a distal end of the second sidewall and includes a fourth inner surface facing the longitudinal axis;
the first and third inner surfaces are separated from each other by a first distance in a first direction orthogonal to the longitudinal axis; and, the second and fourth inner surfaces are separated from each other by a second distance, less than the first distance, in the first direction.

3. The clevis of claim 1, wherein:
the threaded opening has a diameter;
the second portion forms a distal end of the first side wall and includes a first inner surface facing the longitudinal axis;
the fourth portion forms a distal end of the second side wall and includes a second inner surface facing the first inner surface; and,
the first and second inner surfaces are separated, in a first direction orthogonal to the longitudinal axis, by a distance substantially equal to the diameter of the threaded opening.

4. The clevis of claim 1, wherein:
the threaded opening has a diameter;
the second portion forms a distal end of the first side wall and includes a first inner surface facing the longitudinal axis;
the fourth portion forms a distal end of the second side wall and includes a second inner surface facing the first inner surface; and,
the first and second inner surfaces are separated, in a first direction orthogonal to the longitudinal axis, by a distance greater than the diameter of the threaded opening.

5. The clevis of claim 1, wherein:
the threaded opening has a diameter;
the second portion forms a distal end of the first side wall and includes a first inner surface facing the longitudinal axis;
the fourth portion forms a distal end of the second side wall and includes a second inner surface facing the first inner surface; and,
the first and second inner surfaces are separated, in a first direction orthogonal to the longitudinal axis, by a distance less than the diameter of the threaded opening.

6. The clevis of claim 1, wherein:
the threaded opening has a diameter;
the first portion is directly connected to the bridge portion and includes a first inner surface facing the longitudinal axis;
the third portion is directly connected to the bridge portion and includes a second inner surface facing the first inner surface in the radial direction; and,
the first and second inner surfaces are separated, in a first direction orthogonal to the longitudinal axis, by a distance greater than the diameter of the threaded opening.

7. The clevis of claim 1, wherein:
the threaded opening has a diameter;
the first portion is directly connected to the bridge portion and includes a first inner surface facing the longitudinal axis;
the third portion is directly connected to the bridge portion and includes a second inner surface facing the first inner surface in the radial direction; and,
the first and second inner surfaces are separated, in a first direction orthogonal to the longitudinal axis, by a distance substantially equal to diameter of the threaded opening.

8. The clevis of claim 1, wherein:
the threaded opening has a diameter;
the first portion is directly connected to the bridge portion and includes a first inner surface facing the longitudinal axis;
the third portion is directly connected to the bridge portion and includes a second inner surface facing the first inner surface in the radial direction; and,
the first and second inner surfaces are separated, in a first direction orthogonal to the longitudinal axis, by a distance less than the diameter of the threaded opening.

* * * * *